Jan. 28, 1941.  K. L. TATE ET AL  2,230,093
NEEDLE VALVE
Filed Jan. 30, 1940

INVENTOR.
KENNETH L. TATE AND
RAYMOND A. KEBERLE
BY D. Clyde Jones
ATTORNEY.

Patented Jan. 28, 1941

2,230,093

UNITED STATES PATENT OFFICE 2,230,093

NEEDLE VALVE

Kenneth L. Tate and Raymond A. Keberle, Rochester, N. Y., assignors to Taylor Instrument Companies, Rochester, N. Y., a corporation of New York Application January 30, 1940, Serial No. 316,378

2 Claims. (Cl. 251—141)

This invention relates to valves and more particularly to needle valves.

In the past, needle valves have been opened and closed by a rotary adjustment of the valve needle with respect to the valve seat. This rotation of the valve needle has resulted in scoring either the needle or its seat, or both, so that the valve soon became worn. It has been found in practice that when needle valves are used to regulate the flow of fluid, such as air, therethrough, it was not possible to repeat a given rate of flow except by the cut-and-try adjustments of the valve. However, in certain types of pneumatically operated controllers it is important that the needle valve or the like be adjustable to various positions with reference to a graduated scale which indicates for each valve setting, the amount of controlling fluid flowing therethrough in a given interval.

The main feature of the present invention relates to a needle valve of such construction that the adjustment of the valve does not result either in the scoring of the valve seat or the valve needle.

Another feature of the invention relates to the construction of a needle valve in which a given adjustment of the valve needle always results in substantially the same amount of valve opening so that there is an invariable amount of fluid flowing through the valve per unit of time, for each valve adjustment.

A further feature of the invention relates to a needle valve construction in which the needle assembly can be removed for cleaning and then replaced without changing the valve setting.

Figure 1:
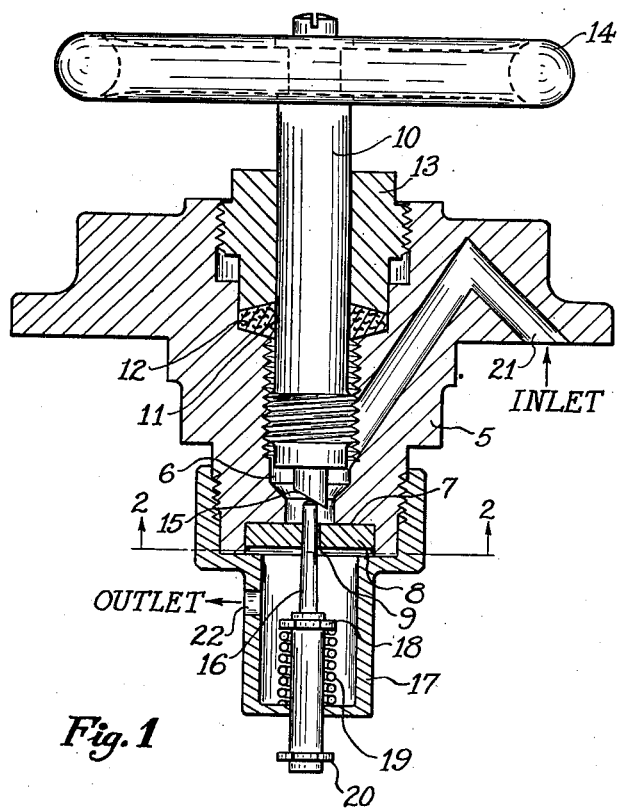
Figure 2:
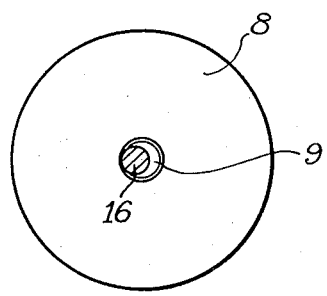

The various features and advantages of the invention will appear from the detailed description and claims when taken with the drawing in which Fig. 1 is an enlarged vertical section taken through the valve and Fig. 2 is a bottom view of the orifice disk and a cross-section through the valve needle taken on the line 2—2 of Fig. 1.

The needle valve of the present invention comprises a valve body 5 having a central bore 6 therethrough. The lower end of the valve body as illustrated in Fig. 1 is recessed about the central bore to provide an annular shoulder 7. The recess is substantially closed by an orifice disk 8 which is joined in air-tight relation to the valve body by means of solder or the like. The orifice 9 in the disk is tapered to provide a generally conical seat. The valve body at an intermediate portion of the bore is internally threaded to make threaded engagement with a stem 10 provided with external threads adjacent its lower end to engage the internal threads of the body. The upper portion of the central bore is somewhat enlarged to provide a seat 11 against which stuffing material 12 engages to prevent leakage between the stem and the body. A gland nut 13 having a central bore therethrough to receive the stem 10, makes threaded engagement with the upper portion of the valve body as indicated and functions to compress the stuffing material 12 against the seat 11. The upper end of the stem 10 is provided with a hand wheel 14 or any other means by which the stem can be rotated with respect to the valve body. The lower end of the stem is provided with a portion of reduced diameter and terminates in an end 15 which is beveled or inclined with respect to the principal axis of the stem. The valve body together with the orifice disk 8 and the lower end of the stem 10 define a chamber. This chamber communicates through a passage 21 with an inlet connectible to a source of compressed air or like fluid, the flow of which is to be controlled by the valve.

It has been mentioned that the orifice plate 8 is provided with a conical bore therethrough serving as a conical valve seat. A valve needle 16, having an end portion of the same taper as that of the valve seat and terminating in a spherical surface, extends through the bore in the disk 8 with its free spherical end engaging the beveled end 15 of the stem. By this arrangement the valve needle in its partially opened position is forced by the beveled end of the stem into eccentric relation with respect to the valve seat and engages one side thereof. The valve needle is preferably spring biased so that its spherical end portion always engages the beveled end of the stem 15 while the valve is open. A convenient way of achieving this biasing action is by providing a cap 17 having its rim internally threaded to engage the threaded end portion of the valve body. The lower end of the cap as shown in Fig. 1 has an aperture therethrough generally in alinement with the bore through the valve body, to receive the lower end of the valve needle.

An intermediate portion of the valve needle is provided with a shoulder 18 against which one end of a helical spring 19 engages, the other end of this spring engaging the inner surface of the cap 17. Thus the mentioned spring tends to urge the valve needle in a direction to close the opening in the orifice disk. The extreme lower end of the valve needle is provided with a shoulder 20 to engage the outer surface of the cap and thereby limit the upward movement of the valve needle (Fig. 1) when the cap 17 is disengaged from body 5. The cap is provided with a lateral outlet opening 22 through which the air within the cap escapes.

It has been found that the shape of a passage through an orifice disk greatly influences the flow of fluid therethrough. For example, the flow of air or a like fluid through an annular passage of a given area differs from the flow of that fluid through a crescent-shaped passage of the same area. Thus if the valve needle can assume various positions laterally with respect to the orifice disk, the passage therethrough may vary from a true annular shape to a crescent shape. Under these last-mentioned conditions the flow of fluid through the valve will not be the same even when the valve needle has the same longitudinal relation to the valve body, due to the possible variable lateral relation between these parts. However, in the arrangement of the present invention, where the needle in its partially open condition is always maintained in eccentric relation with respect to said orifice and in engagement with a side wall thereof, the opening through the orifice is always crescent-shaped and the fluid flow through the orifice is always the same for any given adjustment of the stem.

It will be appreciated that when the stem 10 is adjusted by rotating it in one direction it will move longitudinally toward the disk and the inclined end of the stem will force the needle downward (Fig. 1) against the action of the spring to open the valve. When the stem is adjusted by rotating it in the opposite direction it recedes from the disk, permitting the spring to force the needle into the orifice to close. As a result of each adjustment the inclined end of the stem tends to force the needle into eccentric relation to the orifice so that the opening therethrough is always crescent-shaped. In the present invention the valve needle is never rotated during adjustment and consequently there is no possible scoring of the valve parts. Since the cap 17 with the valve needle assembled thereon, can be removed from the body 5 without changing the adjustment of the stem 10, the valve needle assembly can be removed for cleaning and then replaced without disturbing the valve setting.

We claim:

1. In a device of the class described, a valve body having a bore therethrough, an orifice disc extending across said bore, said disc having its peripheral margin in fluid-tight relation with the wall of said bore, said disc having an orifice therethrough defining a tapered valve seat, a longitudinally adjustable stem extending into said bore with an end thereof positioned adjacent one side of said disc, said end being flat and inclined with respect to the principal axis of said stem, means for sealing said stem in fluid-tight but adjustable relation to the wall of said bore at a point spaced from said disc, said valve body having a passage therethrough leading to said disc at the side thereof adjacent said stem, a tapered valve needle projecting through the orifice in said disc for closing the same, means normally forcing said needle longitudinally with its end in engagement with the inclined flat end of said stem, whereby said valve needle is moved longitudinally and laterally in eccentric relation with respect to said orifice and into engagement with the wall of said orifice when said valve stem is adjusted longitudinally.

2. In a device of the class described, a valve body having a bore therethrough, an orifice disc extending across said bore, said disc having its peripheral margin in fluid-tight relation with the wall of said bore, said disc having an orifice therethrough defining a tapered valve seat, a longitudinally adjustable stem extending into said bore with an end thereof positioned adjacent one side of said disc, said end being flat and inclined with respect to the principal axis of said stem, means for sealing said stem in fluid-tight adjustable relation to the wall of said bore at a point spaced from said disc, said valve body having a passage therethrough leading to said disc at the side thereof adjacent said stem, a member detachably secured to said valve body at the other side of said disc, a valve needle slidably carried by said member, a portion of said valve needle being tapered to correspond to said tapered valve seat and terminating in a free end, said tapered portion of said valve needle projecting through the orifice in said disc for closing the same, means carried by said member normally forcing said needle longitudinally with its free end in engagement with the inclined end of said stem whereby said valve needle is moved longitudinally and laterally in eccentric relation with respect to said orifice and into engagement with the wall of said orifice when said valve stem is adjusted longitudinally.

KENNETH L. TATE.
RAYMOND A. KEBERLE.